United States Patent
Manta et al.

(10) Patent No.: US 12,519,254 B2
(45) Date of Patent: Jan. 6, 2026

(54) ELECTRICAL CONNECTING ELEMENT AND METHOD FOR THE PRODUCTION THEREOF

(71) Applicant: Gentherm GmbH, Odelzhausen (DE)

(72) Inventors: Gabriel Manta, Zusamaltheim (DE); Harald Schoppel, Aystetten (DE)

(73) Assignee: GENTHERM GMBH, Odelzhausen (DE)

( * ) Notice: Subject to any disclaimer, the term of this patent is extended or adjusted under 35 U.S.C. 154(b) by 358 days.

(21) Appl. No.: 18/267,141

(22) PCT Filed: Dec. 16, 2021

(86) PCT No.: PCT/DE2021/000207
§ 371 (c)(1),
(2) Date: Jun. 14, 2023

(87) PCT Pub. No.: WO2022/144054
PCT Pub. Date: Jul. 7, 2022

(65) Prior Publication Data
US 2024/0047900 A1    Feb. 8, 2024

(30) Foreign Application Priority Data

Dec. 31, 2020 (DE) .................. 10 2020 007 925.3
Mar. 24, 2021 (DE) .................. 10 2021 001 530.4

(51) Int. Cl.
*H01R 4/30* (2006.01)
*H01R 4/34* (2006.01)
*H01R 43/16* (2006.01)

(52) U.S. Cl.
CPC ............ *H01R 4/304* (2013.01); *H01R 4/34* (2013.01); *H01R 43/16* (2013.01)

(58) Field of Classification Search
CPC .......... H01R 4/304; H01R 4/34; H01R 43/16
(Continued)

(56) References Cited

U.S. PATENT DOCUMENTS 7,290,334 B2 * 11/2007 Pettersen ................ F16B 43/00
                                                                           29/882
8,647,035 B2 * 2/2014 Bakken ................ F16B 17/006
                                                                          411/108
(Continued)

FOREIGN PATENT DOCUMENTS

CN       209200253 U  * 8/2019
DE        20102063 U1 * 6/2001 ............. B60M 5/00
(Continued)

OTHER PUBLICATIONS

Search Report and Written Opinion dated Mar. 29, 2022, for International Application PCT/DE2021/000207.

*Primary Examiner* — Peter G Leigh
(74) *Attorney, Agent, or Firm* — The Dobrusin Law Firm, P.C.

(57) ABSTRACT

An electrical connecting element that includes an electrically conductive contact bushing which is received in an opening of an electrically conductive flat material and, by an end-face shoulder, abuts a first surface of the electrically conductive flat material; a shaft of the electrically conductive contact bushing is provided on a side which faces away from the end-face shoulder with an electrically conductive union sleeve which surrounds the shaft at least in portions and, by the end-face shoulder, abuts a second surface of the electrically conductive flat material; the electrical connecting element has a form-locking and force-locking connection of the union sleeve to the shaft of the contact bushing.

20 Claims, 1 Drawing Sheet

(58) Field of Classification Search
USPC .......................................................... 439/801
See application file for complete search history.

(56) References Cited

U.S. PATENT DOCUMENTS

| | | | | |
|---|---|---|---|---|
| 9,114,449 | B2 * | 8/2015 | Ross | F16B 37/044 |
| 9,401,578 | B2 * | 7/2016 | Cumant | H01R 43/26 |
| 10,060,464 | B2 * | 8/2018 | Brewer | F16B 39/225 |
| 2007/0149035 | A1 * | 6/2007 | Muller | H01R 12/57 |
| | | | | 439/417 |

FOREIGN PATENT DOCUMENTS

| | | | | | |
|---|---|---|---|---|---|
| DE | 102017210425 | A1 * | 12/2018 | ............. | H01R 13/44 |
| EP | 0891007 | A1 | 1/1999 | | |
| EP | 3664225 | A1 | 6/2020 | | |
| ES | 2278401 | T3 * | 8/2007 | ............. | B21J 15/04 |
| GB | 2477550 | A | 8/2011 | | |

* cited by examiner

ELECTRICAL CONNECTING ELEMENT AND METHOD FOR THE PRODUCTION THEREOF

CROSS-REFERENCE TO RELATED APPLICATIONS

This application is a US National Stage entry of PCT/DE2021/000207 filed on Dec. 16, 2021, which claims priority to DE 10 2020 007 925.3 filed Dec. 31, 2020 and to DE 10 2021 001 530.4 filed Mar. 24, 2021, all of which are hereby incorporated by reference herein for all purposes.

FIELD

The present invention relates to an electrical connecting element and to a method for producing and assembling an electrical connecting element.

BACKGROUND

When producing electrical contacts between flexible lines and rigid connecting or carrier components, different requirements have to be met on a regular basis. For example, most such connections require that the flexible line not be restricted in its possibility of movement. On the other hand, a mechanically loadable connection is to be created. In addition, it is often important to provide sufficient line cross-sections to avoid generating excessive electrical contact resistances at the contact points produced in this manner.

In general, electrical contacts through which significant electrical currents are to flow should aim for the lowest possible contact resistance in order to keep transmission losses, in which electrical current is converted into heat, as low as possible. A special application case for such electrical contacts are terminal contacts, in which a screw connection has to ensure both a detachable mechanical connection and a reliable electrical contact with the lowest possible contact resistance.

The simplest variant for producing an electrical contact between a flexible electrical connection line and a metallic carrier component such as a metal sheet consists of anchoring the line connection in the metal sheet by means of a self-tapping screw. Although this can produce a firm mechanical connection, the full-surface contact between the line connection and the metal sheet cannot always be produced with the desired quality and, in particular, is often not reproducible. For this reason, superior connectivity options are being sought for many use cases.

A common variant for producing screwable terminal contacts consists of attaching a threaded sleeve to a flat metal piece, for example by means of a brazing process or by means of an ultrasonic welding process. A variant that has become common practice in this context also consists of first attaching a contact ring to the flat metal piece in the manner described and then pressing a suitable threaded bushing into it.

SUMMARY

The manufacturing effort required for such a stable anchoring of a threaded bushing is inevitably associated with increased manufacturing costs. For this reason, it can be regarded as a primary object of the present invention to provide an anchoring for line connections to carrier components such as metal sheets or the like, which anchoring can be produced with little effort and at comparatively low cost, and which also exhibits electrical properties that are as favorable as possible.

This object of the invention is achieved by the subject matter disclosed herein. Features of advantageous further developments of the invention can be found herein.

Thus, in order to achieve the aforementioned object, the invention proposes an electrical connecting element having the features disclosed herein, which is essentially intended to provide a screwable contacting option in flat metal pieces such as metal sheets, sheet metal strips, etc., which contacting option can not only be produced quickly and easily, but also offers advantageous electrical properties.

The electrical connecting element according to the invention comprises an electrically conductive contact bushing, which can be designed, for example, as a threaded bushing, and which is received in an opening in an electrically conductive flat material such as a metal sheet, a copper sheet or the like. The opening may be, for example, a hole, a punched-out hole or an otherwise manufactured cut-out in the electrically conductive flat material or in the metal sheet, wherein the size or diameter of the opening usefully corresponds to the dimensions of the threaded bushing so that the threaded bushing can be received with little play or without play in the opening when it is inserted therein.

By joining or inserting the contact bushing in the flat material or metal sheet, the contact bushing by means of an end-face shoulder abuts a first surface of the flat material, while a shaft of the contact bushing is provided with an electrically conductive union sleeve on a side facing away from the end-face shoulder, wherein this union sleeve can also be regarded and referred to as a contact ring.

The union sleeve or the contact ring surrounds the shaft of the contact bushing at least in portions and, by means of an end-face shoulder, abuts a second surface of the electrically conductive flat material.

The invention provides for a form-locking and force-locking connection of the union sleeve to the shaft of the contact bushing, which ensures a largely play-free fixing of the two parts in the flat material when the connecting element is completed.

In the electrical connecting element according to the invention, the union sleeve can surround the shaft of the contact bushing at least in portions in a form-locking and force-locking connection, wherein the form-locking and force-locking connection can in particular be a press-fit connection. By means of such a press-fit connection, plastic deformation processes in the contact areas of the two pressed components create a largely non-detachable connection that does not loosen or come loose in response to the forces and moments that occur during normal use of the connecting element, for example as a result of tensile or bending forces acting from outside.

The shaft of the contact bushing may be cylindrical in shape, at least in portions, wherein the shaft of the contact bushing may be hollow-cylindrical in shape, in particular. In this embodiment, an inner jacket surface of the union sleeve corresponds to an outer jacket surface of the shaft of the contact bushing, so that corresponding contact surfaces are available which are accessible to a form-locking and force-locking press-fit connection and provide sufficient contact areas for a mechanically loadable connection.

To make the electrical connecting element according to the invention suitable for producing screwable and thus detachable electrical connections, in a further advantageous embodiment, an internal thread may be introduced into the contact bushing, optionally in a through hole or in the form of a blind hole thread.

As mentioned above, in an advantageous embodiment, the union sleeve may be hollow-cylindrical in shape, at least in portions. In the fully assembled state of the connecting element, the shoulder of the union sleeve facing the second surface of the flat material abuts the second surface of the flat material, so that a sufficiently large contact surface is created there which exhibits a very low electrical contact resistance.

The pressing process of the three components allows the union sleeve to be connected to the electrically conductive flat material in an electrically conductive manner, since the three parts are non-detachably connected to one another by the pressing process and the shoulders of the components pressed together flatly contact the flat material from both sides in each case.

The flat material can, for example, be a copper sheet or a metal sheet made of a copper alloy or a copper-containing alloy, since such a material has particularly favorable electrical conduction properties.

The union sleeve can also consist of a copper alloy or a copper-containing alloy, wherein a thin metal layer or precious metal layer applied by electroplating, vapor deposition or other suitable coating processes can optionally be provided as a coating. Such a coating can be, for example, a thin nickel layer, a silver or gold coating or similar suitable metal coating.

Since it makes sense to coat copper components to be silver-plated in a multilayer structure, both the union sleeve and the contact bushing can first be coated with a thin nickel layer, wherein the thickness of the coating can usefully be between 1-3 µm. On top of this, a further coating with silver can be applied, usefully with a layer thickness of 2-6 µm.

However, in practice, contacting with plastically deformable metals is useful in the area of the press-fit connection, so that coating is normally dispensed with in this area and preference is to be given to a contacting between copper components.

All of these coating variants mentioned can ensure on the one hand a reduction of undesirable oxidation effects and on the other hand a further reduction of the resulting contact resistance, which in this way can ideally reach values of less than one microohm (<1 µOhm).

Such a connecting element, as described above in various different embodiments, can be used, for example, as a universally applicable connecting element for screw-on line connections in the field of accumulator technology. What is conventionally also referred to as a battery cover generally means the contact areas leading out of rechargeable batteries, which in the interest of modular and universal applicability are usefully equipped with standardized threaded bushings or threaded bolts so that line connections or contact bridges can be screwed thereto.

The connecting element according to the invention can be such a threaded bushing, for example. The connecting element can therefore also be considered or referred to as a so-called module connector. Furthermore, the assembly principle described here can also be considered or referred to as a contact ring connection.

To achieve the above object, the invention further proposes a method for producing and assembling such an electrical connecting element, wherein the method comprises at least the method steps listed and described below.

In the method, an electrically conductive flat material is first provided, which has at least one opening of defined size and/or defined contour. An electrically conductive contact bushing is inserted there, namely into the opening of the electrically conductive flat material, until the contact bushing by means of an end-face shoulder abuts a first surface of the flat material.

Contact is then made with a shaft of the contact bushing on a side facing away from the end-face shoulder by means of an electrically conductive union sleeve which surrounds the shaft at least in portions.

Finally, the method provides for producing a form-locking and force-locking and, in particular, permanent connection between the union sleeve and the shaft of the contact bushing, wherein the union sleeve by means of an end-face shoulder abuts a second surface of the electrically conductive flat material in flat and electrically conductive contact.

In the method, the form-locking and force-locking connection is produced in particular by a pressing process in which the union sleeve is pushed onto the shaft of the contact bushing and pressed there, wherein plastic deformation can take place at least in certain areas between the components pressed together.

The method ensures that as a result of the pressing process of the three components, the union sleeve is permanently and electrically conductively connected to the electrically conductive flat material, which in particular means a non-detachable connection of the three parts.

The particular advantage consists in the fact that this allows for creating a mechanically loadable electrical connection with very low contact resistance, which can be suitable for various purposes.

It should be expressly mentioned at this point that all aspects and embodiment variants explained in connection with the electrical connecting element according to the invention equally relate to or can form partial aspects of the method according to the invention for producing and assembling such an electrical connecting element. Therefore, if at any point in the description or also in the claim definitions concerning the connecting element according to the invention reference is made to certain aspects and/or interrelationships and/or effects, this applies equally to the method according to the invention. The same applies in reverse, so that all aspects and embodiment variants explained in connection with the method according to the invention for producing and assembling an electrical connecting element also equally relate to or can be partial aspects of the electrical connecting element according to the invention. Therefore, if at any point in the description or also in the claim definitions concerning the method according to the invention reference is made to certain aspects and/or interrelationships and/or effects, this applies equally to the electrical connecting element according to the invention.

In the following, embodiment examples will explain the invention and its advantages in more detail with reference to the accompanying Figures. The size ratios of the individual elements to each other in the Figures do not always correspond to the real size ratios, since some forms are simplified and other forms are shown enlarged in relation to other elements for better illustration.

DETAILED DESCRIPTION

Figure 1:
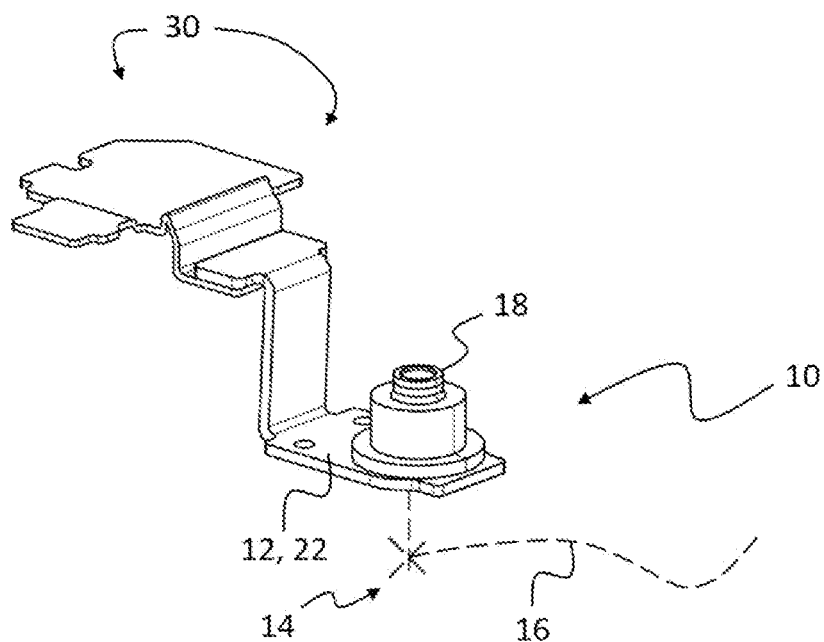
FIG. 1 shows a schematic perspective view of an embodiment variant of an electrical connecting element according to the invention.
Figure 2:
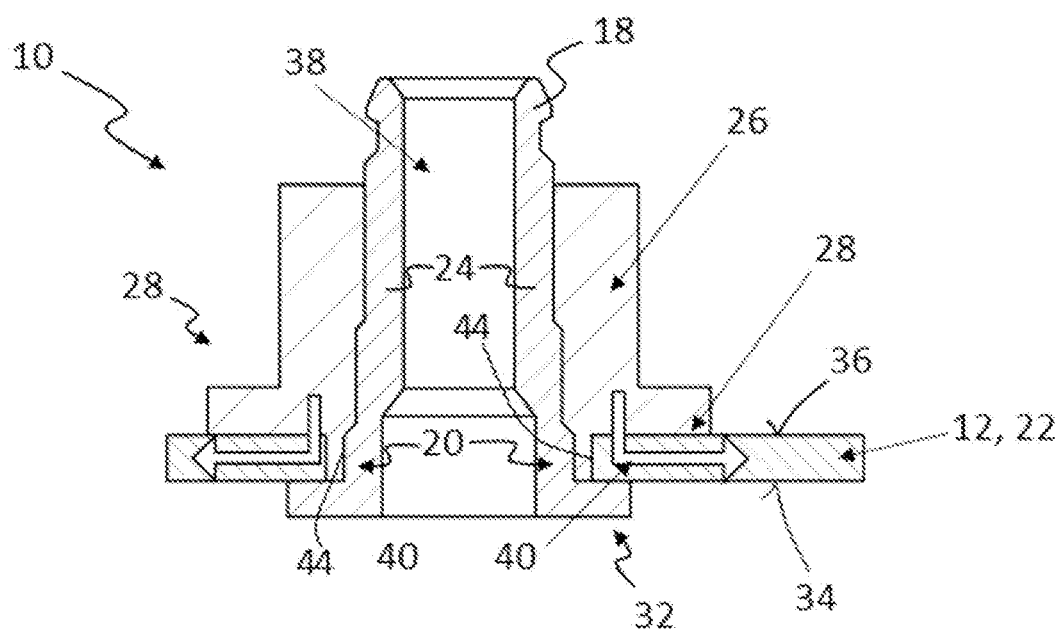
FIG. 2 shows a schematic longitudinal section through the individual components of the variant of the connecting element shown in FIG. 1.

FIGS. 1 and 2 each use the same reference numbers for identical or identically functioning elements of the invention. Furthermore, for the sake of clarity, only reference numbers which are necessary for the description of the respective Figure are shown in the individual Figures. The embodiments shown are merely examples of how the invention can be designed and do not represent a conclusive limitation. Also, the features described below are in each case not to be understood in close context with further features of the respective embodiment example, but can in each case be provided in the general context or be used therefore.

The schematic perspective view of FIG. 1 shows an arrangement including an embodiment variant of a connecting element 10 according to the invention. Thus, a possible application is outlined by way of example, since the connecting element 10 can serve in particular to provide a screwable contacting option for line connections in a flat metal section 12, in a metal sheet, sheet metal strip, etc. A rigid or flexible electrical line 16, for example, can be attached to a lug (not shown here) which can be fastened with a screw 14. The screw 14 and the line 16 are each indicated here by interrupted lines.

The exemplary electrical connecting element 10 shown here according to the invention comprises an electrically conductive contact bushing 18, which is designed as a threaded bushing and which is received in an opening 20 of the flat metal section 12 formed by a sheet metal strip 22. The opening 20 can, for example, be a suitably dimensioned hole or punched hole in the metal section 12 or in the sheet metal strip 22.

An electrically conductive union sleeve 26 is pushed over a shaft 24 of the contact bushing 18, which union sleeve has an annular collar 28 on the end face which abuts the sheet metal strip 22. A press-fit connection between the union sleeve 26 and the shaft 24 of the contact bushing 18 provides a fixation of the elements in the flat metal section 12 largely without play.

As a purely precautionary measure, it should be clarified at this point that the term electrical connecting element 10 used in the present context comprises the three components mentioned, which interact in the manner described, namely the flat metal section 12 or sheet metal strip 22, in the opening 20 of which the contact bushing 18 is located, which is fixed without play in the metal section 12 or sheet metal strip 22 by means of the union sleeve pressed onto the shaft 24.

The sheet metal strip 22 can optionally continue in the manner shown in FIG. 1 in multiple angled sheet metal sections 30, which can for example be part of an electrical connection contact of a battery cell or the like.

The schematic longitudinal section of FIG. 2 again shows in detail the interacting components of the embodiment variant of the electrical connecting element 10 according to the invention shown here.

As illustrated schematically in FIG. 2, the cylindrical shaft 24 can be optionally stepped, wherein steps of slightly smaller diameter can adjoin each other in the longitudinal direction of the shaft 24. The shaft 24 has its largest diameter in an area located in the opening 20 of the sheet metal strip 22. That the contact bushing 18 is held in this position is due to an end-face collar area 32 which is larger in diameter than the opening 20, so that a rear face of the end-face collar area 32 of the contact bushing 18 abuts a first surface 34 of the sheet metal strip 22 and in this respect fixates the contact bushing 18 to the first surface 34.

The shaft 24 of the contact bushing 18, which passes through the opening 20, tapers toward its other end in several steps. As can be seen from the schematic longitudinal section of FIG. 2, this shaft 24, which tapers slightly in diameter in steps, is provided in a direction facing away from the end-face collar area 32 with the electrically conductive union sleeve 26, the inner jacket surface of which is shaped in such a way that it surrounds the shaft 24 in a form-locking and force-locking manner and, for its part, by means of its end-face collar 28 abuts a second surface 36 of the sheet metal strip 22, wherein the second surface 36 is located opposite the first surface 34.

In the embodiment example described here, the form-locking and force-locking connection between the union sleeve 26 and the shaft 24 of the contact bushing 18 is formed by a press-fit connection. By means of such a press-fit connection, a largely non-detachable connection is created by means of plastic deformation processes in the surrounding areas of the two pressed components 24 (shaft) and 26 (union sleeve), which connection can also withstand greater forces that may occur during normal use of the connecting element 10.

Since the contact bushing 18 is intended for receiving a threaded screw 14 (cf. FIG. 1), it is hollow-cylindrical in shape and equipped with an internal thread 38.

A current flow 40 occurs with low contact resistance between the union sleeve 26 and the sheet metal strip 22. The resulting contact resistance between the union sleeve 26 and the sheet metal strip 22 is preferably a maximum of 1 μOhm per connector. This is favored by at least one of the following features:

- The collar 28 of the union sleeve 26 makes flat contact with the second surface 36 of the sheet metal strip 22.
- At least one of the two parts, union sleeve 26 and sheet metal strip 22, is provided in at least one contact area with a coating which contains a minimum proportion of at least one of the elements Ni, Ag and Au, preferably a proportion of at least 30% by mass, preferably nickel. The coating in this contact area is preferably between 0.1 and 10 μm, preferably 1-3 μm thick.
- Preferably, friction and shear forces occur when the union sleeve 26 and the sheet metal strip 22 are pressed together. Preferably, this results in the materials of the two parts flowing into each other, as in a material-bonding connection. For this, preferably at least one of the two parts, union sleeve 26 and sheet metal strip 22, has one or more surface unevennesses with a roughness value Sa of at least 1 μm, projections, edges, undercuts, teeth, thorns, and/or other structures with a penetrating effect, at least before pressing. At the beginning of pressing, these structures penetrate a surface of a counterpart to be joined, rub against the counterpart during the relative movement of the pressing motion, and cut or melt into it. Preferably, both components have such structures at least before pressing.
- For this purpose, the union sleeve 26 preferably has a toothed collar which is pressed into the opening in the sheet metal strip 22. Interlocking preferably takes place in the horizontal area of the copper sheet.

REFERENCE SYMBOL LIST

10 Connecting element, electrical connecting element
12 Metal section, flat metal section 14 Screw, threaded screw
16 Line, electrical connection line, line section
18 Contact bushing
20 Opening
22 Sheet metal strip
24 Shaft
26 Union sleeve
28 Collar (of the union sleeve)
30 Sheet metal sections
32 End-face collar area, end-face collar (of the contact bushing)
34 First surface (of the flat metal section, of the sheet metal strip)
36 Second surface (of the flat metal section, of the sheet metal strip)
38 Internal thread
40 Current flow

The invention claimed is:

1. An electrical connecting element comprising an electrically conductive contact bushing which is received in an opening of an electrically conductive flat material and, by an end-face shoulder, abuts a first surface of the electrically conductive flat material, wherein a shaft of the electrically conductive contact bushing is provided on a side which faces away from the end-face shoulder with an electrically conductive union sleeve which surrounds the shaft at least in portions and, by its end-face shoulder, abuts a second surface of the electrically conductive flat material, wherein the electrical connecting element comprises a form-locking and force-locking connection of the union sleeve to the shaft of the contact bushing, wherein the union sleeve comprises a ring that is configured to extend into a gap defined between an outer surface of the shaft and an inner surface of the opening in the electrically conductive flat material.

2. The electrical connecting element according to claim 1, wherein the electrically conductive union sleeve surrounds the shaft of the electrically conductive contact bushing at least in portions, wherein the form-locking and force-locking connection is a press-fit connection.

3. The electrical connecting element according to claim 1, wherein the shaft of the electrically conductive contact bushing is cylindrical in shape, at least in portions, wherein the shaft of the electrically conductive contact bushing has a hollow-cylindrical in shape.

4. The electrical connecting element according to claim 1, wherein the electrically conductive contact bushing has a through hole with an internal thread.

5. The electrical connecting element according to claim 1, wherein the ring is circular and extends around the shaft and at least partially along a length of the shaft.

6. The electrical connecting element according to claim 1, wherein the ring extends in a downward direction and the end-face shoulder of the union sleeve extends in a horizontal or lateral direction.

7. The electrical connecting element according to claim 1, wherein after the ring extends into the gap, the gap between the outer surface of the shaft and the inner surface of the opening in the electrically conductive flat material is taken up or eliminated.

8. The electrical connecting element according to claim 1, wherein the shaft comprises a tapered profile as the shaft extends in a direction away from its end-face shoulder.

9. The electrical connecting element according to claim 1, wherein the union sleeve engages a first surface of the electrically conductive flat material and a second surface of the electrically conductive flat material, wherein the first surface and the second surface are arranged in different planes.

10. The electrical connecting element according to claim 9, wherein the first surface is a substantially vertical surface of the electrically conductive flat material and the second surface is a substantially horizontal surface of the electrically conductive flat material.

11. The electrical connecting element according to claim 1, wherein the shaft comprises an outer surface that includes a contact surface with steps and the union sleeve comprises an inner surface that includes a contact surface with steps that correspond to the steps of the contact surface of the shaft.

12. The electrical connecting element according to claim 1, wherein by pushing the union sleeve onto the shaft, the steps of the corresponding contact surfaces of the shaft and the union sleeve come into contact to form the form-locking and force-locking connection therebetween.

13. A method of producing and assembling an electrical connecting element, comprising:
   providing an electrically conductive flat material having at least one opening of defined size and/or defined contour;
   inserting an electrically conductive contact bushing into the opening of the electrically conductive flat material, wherein the electrically conductive contact bushing, by an end-face shoulder, abuts a first surface of the electrically conductive flat material;
   making contact with a shaft of the contact bushing on a side facing away from the end-face shoulder, by an electrically conductive union sleeve, which surrounds the shaft at least in portions; and
   wherein an outer surface of the shaft comprises a contact surface with steps and an inner surface of the union sleeve comprises a contact surface with steps that correspond to the steps of the contact surface of the shaft, and the method comprises producing a form-locking and force-locking or a permanent connection between the electrically conductive union sleeve and the shaft of the electrically conductive contact bushing upon pushing the union sleeve onto the shaft so that the steps of the corresponding contact surfaces of the shaft and the union sleeve come into contact,
   wherein the union sleeve, by the end-face shoulder, abuts a second surface of the electrically conductive flat material in flat and electrically conductive contact.

14. The method according to claim 13, wherein the union sleeve comprises a downwardly-extending ring and during the pushing step, the ring is configured to extend into a gap defined between an outer surface of the shaft and an inner surface of the opening in the electrically conductive flat material.

15. The method according to claim 14, wherein the ring is circular and extends at least partially along a length of the shaft and/or the ring extends in a downward direction and the end-face shoulder of the union sleeve extends in a horizontal or lateral direction.

16. The method according to claim 14, wherein after the ring extends into the gap, the gap between the outer surface of the shaft and the inner surface of the opening in the electrically conductive flat material is taken up or eliminated.

17. The method according to claim 13, wherein the union sleeve engages a first surface of the electrically conductive flat material and a second surface of the electrically conductive flat material, wherein the first surface and the second surface are arranged in different planes.

18. The method according to claim 17, wherein the first surface is a substantially vertical surface of the electrically conductive flat material and the second surface is a substantially horizontal surface of the electrically conductive flat material.

19. An electrical connecting element comprising:
   a flat material comprising a first surface, an opposing second surface, and an opening that extends through a thickness of the flat material, the opening is defined by an inner surface, the flat material is electrically conductive;
   a contact bushing comprising a shaft and a flange, the shaft tapers in a direction extending away from the flange, an outer surface of the shaft comprises steps, and an inner surface of the shaft comprises an internal thread; wherein the shaft is received into the opening of the flat material such that a gap is defined between the outer surface of the shaft and the inner surface of the opening, a top surface of the flange contacts the first surface of the flat material;
   a union sleeve comprising an inner surface, a flange, and a ring; the inner surface comprises steps that correspond to the steps on the outer surface of the shaft; the union sleeve is configured to surround the shaft such that the steps of the inner surface contact the steps on the outer surface of the shaft, the ring extends into and fills the gap defined between the outer surface of the shaft and the inner surface of the opening, a bottom surface of the flange of the union sleeve contacts the second surface of the flat material,
   wherein by pushing the union sleeve onto the shaft, the steps of the corresponding contact surfaces of the shaft and the union sleeve come into contact, and
   wherein an electrical line is configured to be electrically connected to a bottom of the shaft in a region that is adjacent to the flange of the shaft, and electrical current is configured to pass from the electrical line into and through the union sleeve and into the flat material.

20. A method of making the electrical connecting element according to claim 19, comprising:
   inserting the contact bushing into the opening of the flat material so that the top surface of the flange contacts the first surface of the flat material;
   pushing the union sleeve onto and over the shaft so that i) the steps of the corresponding contact surfaces of the shaft and the union sleeve come into contact, ii) the ring extends into and fills the gap defined between the outer surface of the shaft and the inner surface of the opening, and iii) the bottom surface of the flange of the union sleeve contacts the second surface of the flat material.

* * * * *